United States Patent [19]
Dalena et al.

[11] 3,792,304
[45] Feb. 12, 1974

[54] SCALED GRAPHIC LINE DISPLAY ON CATHODE-RAY TUBE WITH UNIFORM BRIGHTNESS

[75] Inventors: Rudolph Dalena, Placentia, Calif.; Donald F. Walker, Boulder, Colo.

[73] Assignee: Hughes Aircraft Company, Culver City, Calif.

[22] Filed: July 24, 1972

[21] Appl. No.: 274,548

[52] U.S. Cl. .................................................. 315/18
[51] Int. Cl. ............................................. H01j 29/72
[58] Field of Search ............. 343/5 DP, 5 R; 315/18

[56] References Cited
UNITED STATES PATENTS

| | | |
|---|---|---|
| 3,582,705 | 6/1971 | Waller et al. .......................... 315/18 |
| 3,721,856 | 3/1973 | Dick ................................. 315/18 X |
| 3,683,380 | 8/1972 | Cantwell, Jr. et al. ........ 343/5 DP X |
| 3,500,402 | 3/1970 | Huele et al. ...................... 343/5 DP |
| 3,723,803 | 3/1973 | Harrison et al. ................. 315/18 X |
| 3,718,832 | 2/1973 | Premru et al. ......................... 315/18 |

Primary Examiner—Malcolm F. Hubler
Attorney, Agent, or Firm—Martin E. Gerry

[57] ABSTRACT

In a radar PPI display system, uniform brightness is maintained for graphic lines displayed between radar sweeps by generating every graphic line at the same rate regardless of range scale selected. Range data for each graphic line is scaled as a function of range scale in a range counter which counts down clock pulses at a fixed rate, thus scaling each graphic line as a function of range scale.

5 Claims, 7 Drawing Figures

SCALED GRAPHIC LINE DISPLAY ON CATHODE-RAY TUBE WITH UNIFORM BRIGHTNESS

The invention herein described was made in the course of or under a contract or sub-contract thereunder with the Air Force.

BACKGROUND OF THE INVENTION

This invention relates to cathode-ray-tube (CRT) displays, and more particularly to display of graphic lines.

Real-time radar systems have a variety of data to display. For example, in a plan-position-indicator (PPI) system, it is often desirable to display an antenna reference azimuth with respect to the radar. That azimuth can be displayed during the radar dead time, i.e., during the time after the radar system stops listening for return signals and before another pulse of energy is transmitted from the antenna. Following the dead time, the radar system displays the usual radar return signals.

It is desirable to have each graphic line displayed with the same brightness for all display range scales. Normally, a different range scale requires a different CRT deflection rate. To retain the same brightness, it has been the practice to switch an intensity compensation circuit as a function of range scale, or to otherwise vary intensity as a function of the rate at which the CRT beam is being deflected. This has not been completely satisfactory because constant brightness between range scales is difficult to maintain with intensity compensation techniques. Since the characteristics of the CRT differ from one type to another, due to the different materials used on the fluorescent screen, it is necessary to design the compensation circuit for the particular type of CRT. In each case, the design is difficult to achieve because of nonlinearities in the characteristic of the tube.

OBJECTS AND SUMMARY OF THE INVENTION

An object of this invention is to obviate the need for intensity compensation circuits in a CRT display system and still assure a display of graphic lines with uniform brightness for all range scales.

This and other objects of the invention are achieved in a cathode-ray tube (CRT) display system using digital X- and Y-axis deflection systems for all line graphics, and having a variable display scale for all line graphics, by providing the same constant deflection rate for the CRT beam for all range scales. A length-counting means stores a desired line-length number in binary form. Upon receipt of a start command, pulses from a constant clock source are counted. When the number of clock pulses counted is equal to the stored line-length number, preferably determined by counting the stored number down to zero, the line end point is reached. A digital rate multiplying means stores line-angle ($\theta$) data in the form of digital values of cosine $\theta$ and sine $\theta$, and multiplies the line length count by the stored cosine and sine values to obtain X and Y trains of pulses. Slope counting means count up, or down, separately the X and Y trains of pulses, the direction of counting being effectively determined by the signs of the cosine and sine values. Digital-to-analog converters continually sample the slope counting means to provide analog voltages to respective X and Y deflection amplifiers for CRT beam deflection. To change scale, and yet maintain a constant CRT beam deflection rate, the line-length data entered into the length counting means is scaled by appropriate means according to the scale selected. For a scale of $\tfrac{1}{2}^n$, where $n$ is an integer 0, 1, 2 ... the line-length data is scaled by shifting it to the left (in the direction of the most significant bit position) $n$ bit positions as entered into the length counting means. As the line-length number is shifted left for range scaling, an extra bit of resolution is added per range scale to maintain accuracy in the line end point.

The novel features that are considered characteristic of this invention are set forth with particularity in the appended claims. The invention will best be understood from the following description when read in connection with the accompanying drawings.

DESCRIPTION OF THE PREFERRED EMBODIMENTS

Figure 1:
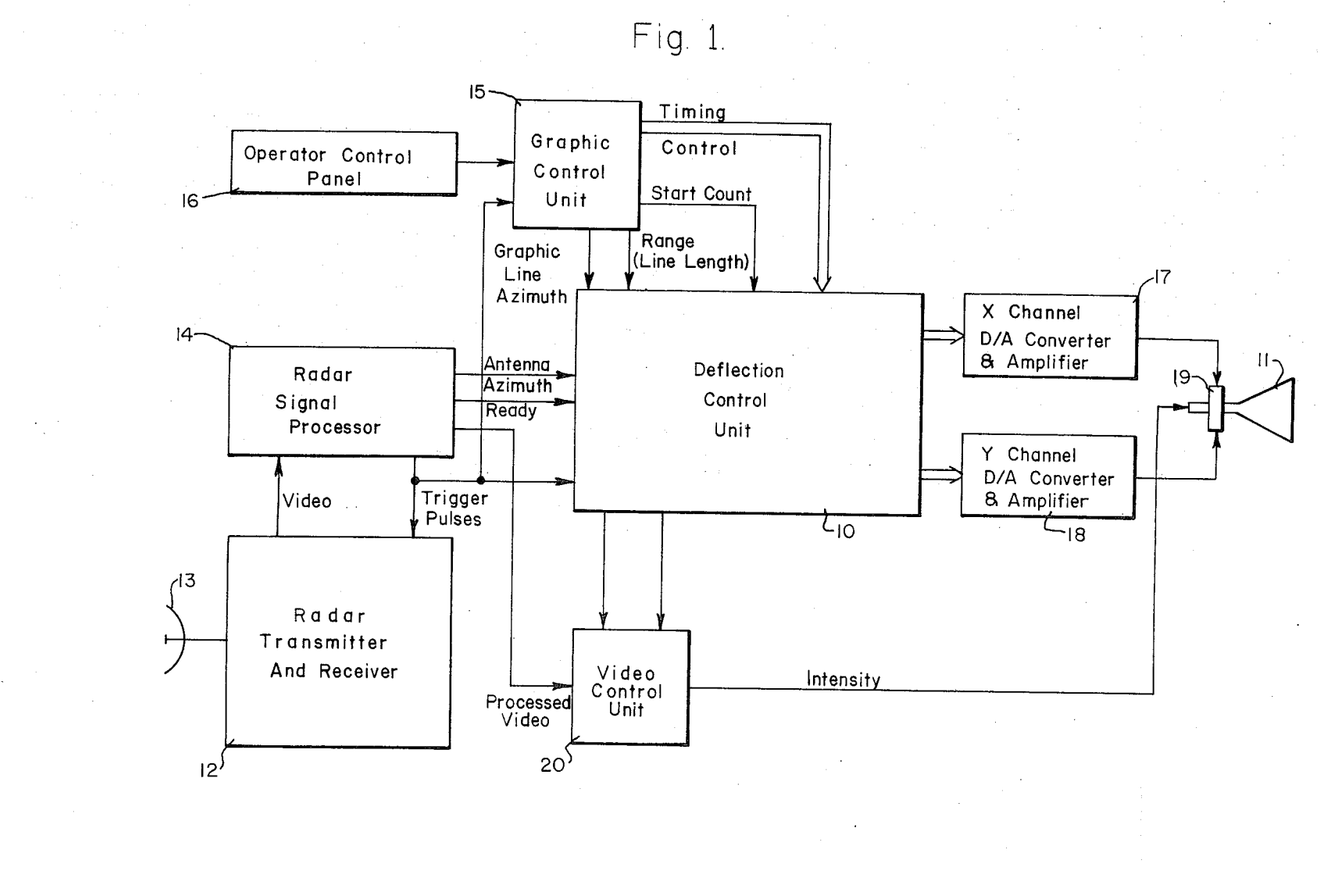
FIG. 1 illustrates in a block diagram an exemplary environment for the present invention.

Referring to FIG. 1, which shows a general block diagram of an exemplary radar system, the present invention relates to the novel manner in which a deflection unit 10 is implemented for generating graphic lines on the face of a cathode-ray tube 11 during radar dead time. A radar transmitter and receiver 12 transmits pulses through an antenna 13 at a fixed rate controlled by trigger pulses from a radar signal processor 14, and after each pulse listens for a return signal for a specified period. The same antenna is used for both transmitting and receiving radar pulses.

The pulse repetition frequency (PRF) is selected to allow for more than enough time for returns from the maximum range of interest. The radar signal processor 14 generates a trigger each time a radar pulse is to be transmitted and transmits the trigger pulse to the deflection unit and graphic control unit 15 for timing a period, the listening period during which video pulses are received and processed for display. The processor receives the video pulses and, through the deflection unit and a video control unit 20, controls their display in the usual manner, such as in a plan position indicator (PPI) mode. Following the listening period, a START pulse is transmitted by the graphic control unit 15 to the deflection unit to initiate and maintain an alternate mode of controlling the CRT beam for graphic-line display.

For the PPI mode, the necessary control inputs are provided by the radar signal processor. For graphic-line mode, the necessary control inputs are manually provided by an operator control panel 16. In each mode, the deflection unit outputs are $X$ and $Y$ coordinate values for the CRT in digital form. Two units 17 and 18 convert the respective $X$ and $Y$ coordinates to analog form, and amplify the analog signals to the level necessary for a deflection yoke 19 of the CRT. The video control unit 20 blanks the CRT beam while the transition from one mode to the other takes place, and as otherwise required during both the normal PPI mode and the graphic-line mode.

Before proceeding with a description of a preferred embodiment of the invention, a more detailed description of the organization and function of the deflection unit will be given with reference to FIG. 2. A clock generator 27 provides a stable frequency reference for sweep and system clocks. A 20.7205 MHz crystal controlled oscillator is used to generate a clock pulse train which clocks an eight bit sweep clock counter and a five bit system clock counter. Sweep clocks are generated during radar display time, and therefore not of interest in the present invention which is active only during radar dead time. The system clocks at 647.515 KHz are generated by the five bit counter from the 20.7205 MHz clock. From the system clock counter, the following clocks are derived: 10.36 MHz for graphic line fast count; 5.18 MHz for normal graphic line count; and 647.515 KHz for use in all units as a basic clock.

An azimuth control unit 22 receives in digital form antenna azimuth $\theta$ from a line receiver 23 or a graphic line azimuth $\theta$ from the graphic control unit 15 (FIG. 1), and converts the received azimuth value to sine $\theta$ and cosine $\theta$ values (in digital form) for use by $X$ and $Y$ digital rate multipliers in a line generator unit 24. Count direction is also included in the converted azimuth value as a sign bit for use in an $X$ and $Y$ axis control unit 25.

The azimuth control unit 22 consists of a storage register for the azimuth value to be converted and a read-only memory which uses the azimuth value to address a look-up table and read out the sine and cosine values. It also includes a network to decode the azimuth value and provide the proper signs for use as $X$ and $Y$ axis count direction control.

Loading of the storage register is controlled by the graphic control unit during the initial part of radar dead time, i.e., immediately after the radar ranging period is concluded. The azimuth value thus stored is retained throughout most of radar dead time. Near the end of that time, the radar antenna azimuth is loaded into the register for use during radar sweep time. A READY signal is also transmitted to the line receiver to signify that valid antenna azimuth is available at its inputs for sampling.

Figure 2:
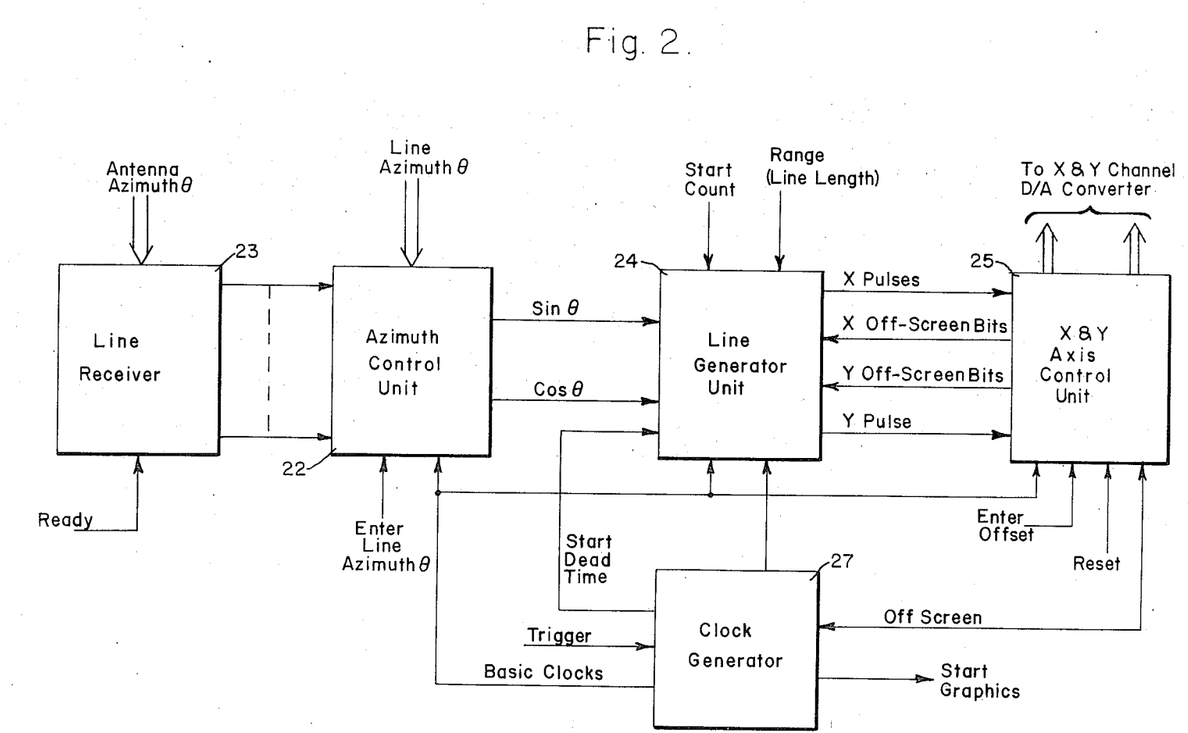
FIG. 2 illustrates in a block diagram a general implementation of the deflection unit of FIG. 1.

What has been described with reference to FIGS. 1 and 2 is the environment of the present invention in general terms. Other equivalent environments may use the present invention to equal advantage. The line generator unit 24, which embodies the invention, will now be described with reference to FIG. 3.

The line generator unit 24 is comprised of four basic parts: the range counter 30 and counter control 31; the $X$ and $Y$ digital rate multipliers (DRM), 32 and 33, and associated $X$ and $Y$ DRM registers, 34 and 35; a temporary storage register 36 and accelerated count control 37. The last two are used only for off-screen line control generation, as will be more fully described with reference to FIGS. 4 to 6. During radar dead time, the range counter stores graphic-line range data from the graphic control unit and, upon receipt of a START COUNT command from graphic control unit, counts down until an all-zero state is reached. The range counter count down to zero determines that the line end point has been reached and terminates the generation of the line. The unit then awaits receipt of the next line data and start command.

Figure 3:
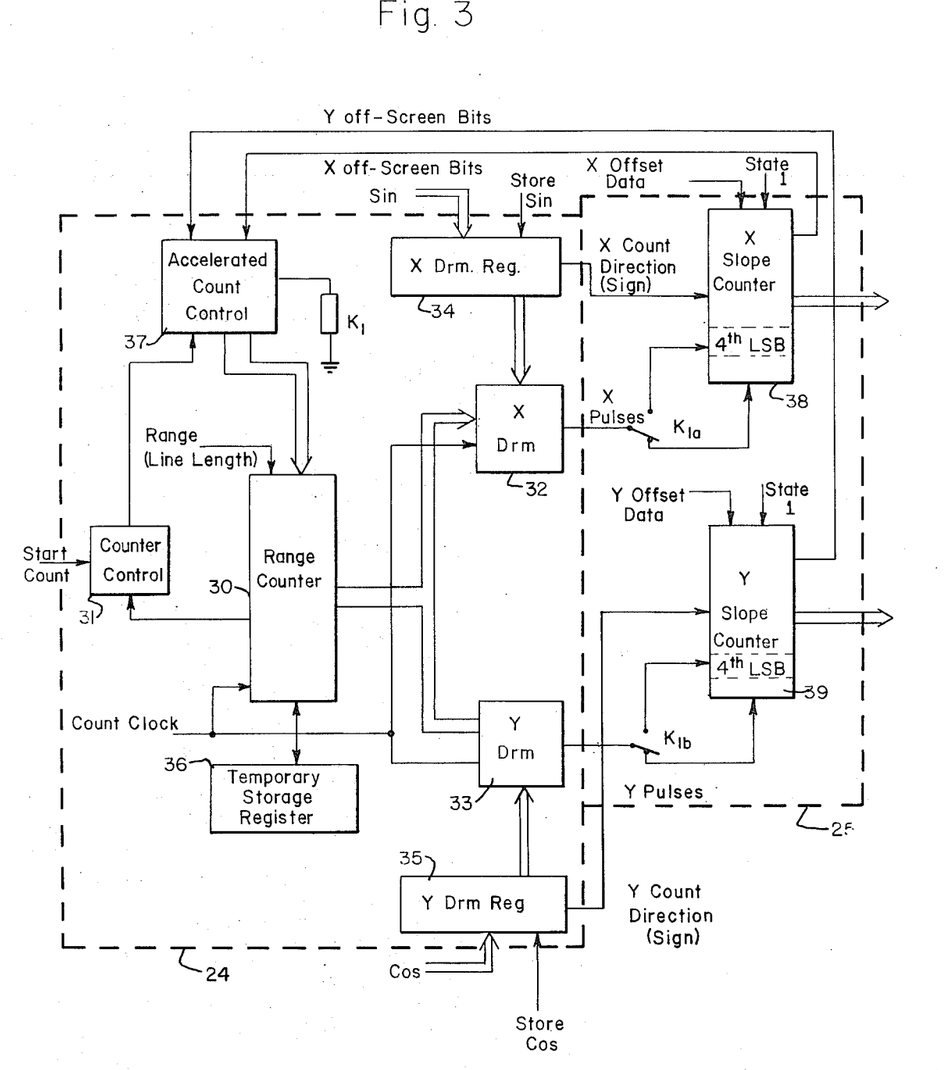
FIG. 3 illustrates in a block diagram a preferred embodiment of the line generator unit of FIG. 2 in accordance with the present invention.

Each time the range counter is loaded, the range data is also rescaled with LSB's stored in the temporary storage register 36 for use in the event an off-screen condition is present. That condition may be present when $X$ and $Y$ slope counters 38 and 39 are loaded with $X$ and $Y$ offset data from the graphic control unit corresponding to a starting point for the line to be generated off the screen by a predetermined amount.

The line is generated at a constant rate for a constant brightness by generating the $X$ and $Y$ trains at a fixed rate as follows. The registers 34 and 35 store the line azimuth (angle) data in the digital form of sin $\theta$ and cos $\theta$, respectively, as noted hereinbefore. While the range counter is counting down, at a predetermined constant rate, the $X$ and $Y$ DRM's receive the outputs of the range counter, the count clocks at 5.18 MHz, and the azimuth sine and cosine data. The DRM's transmit the count clock as a multiplication function of $X=R \sin \theta$ and $Y=R \cos \theta$ in a well known manner. When the range counter has reached zero, the $X$ and $Y$ pulse trains stop, thus having produced a number of $X$ and $Y$ pulses proportional to $R \sin \theta$ and $R \cos \theta$. The slope counters 38 and 39 count the respective $X$ and $Y$ pulses to generate in digital form the deflection values necessary for the CRT beam to trace the desired line. These digital values are continually being converted by D/A converters in units 17 and 18 (FIG. 1) for use in the CRT deflection units.

Prior to the START COUNT command, initial $X$ and $Y$ line position values are stored in the $X$ and $Y$ slope counters. The counters then count up or down as directed by count direction control signals from the azimuth control unit according to the signs of the sine and cosine values entered into the registers 34 and 35. For an angle $\theta$ in the first quadrant (0° to 90°) both count up; in the second quadrant (90° to 180°), the $Y$ slope counter counts down; in the third quadrant (180° to 270°), both count down; and in the fourth quadrant (270° to 360°), the $X$ slope counter counts down. In each case, the count is at the rate of the respective $X$ and $Y$ pulse trains. That rate is determined by the rate at which the range counter receives count clock pulses from the azimuth control unit. That rate is a predetermined constant rate; therefore, the line is generated at a constant rate.

When the range scale is changed, that line generating rate is maintained constant by rescaling the range data in the range counter as a function of range scale. The range value entered is shifted to the maximum right data position (LSB's) for the maximum range, Range 1 in the following table. Each range scale decrement results in a range data left shift of one position as shown in the following table. The range counter data is indicated by $X$'s which are to be interpreted as representing binary 0 and 1 digits.

TABLE I

| | MSB | | | | | | Range counter | | | | | | | | | LSB | Maximum count down clocks |
|---|---|---|---|---|---|---|---|---|---|---|---|---|---|---|---|---|---|
| Range 1 | O | O | O | O | O | O | O | X | X | X | X | X | X | X | X | X | 511 |
| Range 1/2 | O | O | O | O | O | O | X | X | X | X | X | X | X | X | X | X | 1023 |
| Range 1/4 | O | O | O | O | O | X | X | X | X | X | X | X | X | X | X | X | 2047 |
| Range 1/8 | O | O | O | O | X | X | X | X | X | X | X | X | X | X | X | X | 4095 |
| Range 1/16 | O | O | O | X | X | X | X | X | X | X | X | X | X | X | X | X | 8191 |
| Range 1/32 | O | O | X | X | X | X | X | X | X | X | X | X | X | X | X | X | 16383 |
| Range 1/64 | O | X | X | X | X | X | X | X | X | X | X | X | X | X | X | X | 32767 |
| Range 1/128 | X | X | X | X | X | X | X | X | X | X | X | X | X | X | X | X | 65535 |

As range data is shifted left, an extra bit of resolution is added per range scale to maintain line end point accuracy. Since the number of clocks required to count down the range counter to zero is doubled per range scale decrement, this effectively doubles the line length, but the deflection rate of the CRT beam is not doubled. The LSB's of the slope counters always toggle at the same clock rate resulting in a constant generating rate for lines at all range scales. In the past, the range counter always counted down the maximum number of clocks required for the minimum range scale (in the case shown = 65535 clock pulses) regardless of range scale selection. The line length was doubled by deleting one LSB from each slope counter per range scale decrement. That technique resulted in the line generation rate being twice as fast per range scale decrement with the clock rate constant.

The range counter receives count clocks from the clock generator 27 (FIG. 2). The clock generator selects for the count clocks an appropriate sweep clock rate during radar sweep time, i.e., during radar live time. Those sweep clocks are selected as a function of range scale. For the graphic line mode, i.e., during radar dead time, the count clock rate selected is always 5.18 MHz, unless the origin of a graphic line is determined to be greater than, for example, 1.5 times the selected range radius, in which case a 10.36 MHz clock is selected for the count clocks to provide a fast count until the line is within the "1.5-times" criterion. Then the slower 5.18 MHz clock is substituted for display of the line generated at a constant rate on the screen. If the line generated goes off the screen near its terminal end, that condition is detected by a slope count in excess of 1.5 times the selected range radius and the line count is terminated in any suitable manner, as by resetting the range counter to zero at that point via the accelerated count control unit 37. In that manner, a fast count is produced to complete the line-generation process in a shorter period of time than would otherwise be the case.

To accomplish this graphic line display, the line generation unit 24 (FIG. 2) responds to the START LINE signal to switch the count clocks from the clock generator 27 from a sweep clock selected for the range being used for normal PPI display to a clock at 10.36 MHz or 5.18 MHz, depending upon whether or not an OFF SCREEN signal is being generated by the axis control unit 25. All of the required clocks are being continually generated from the high frequency clock of 20.7205 MHz so that selection is merely a matter of getting out the desired count clock.

The OFF SCREEN signal is developed in the axis control unit as indicated in FIG. 2, as well it may be, by monitoring the $X$ OFF SCREEN bits and the $Y$ OFF SCREEN bits, e.g., the bit positions 9 through 15 of the $X$ and $Y$ slope counters, where the bit positions are counted from the LSB. If the sum of bits 9 through 15 in either slope counter equals 1.5 $R$, where the LSB is weighted $1/512$ $R$, there is an off screen condition. Once the OFF SCREEN signal is generated, display blanking occurs (by means in the video control unit 20) and fast count is enabled to occur in the graphic mode until the off-screen condition is no longer present.

The slope counters could begin at a point greater than $1.5R$ in either axis (where $R$ is the radius of the display area on the screen) and count to a point within 1.5 $R$ in both axes, at which time normal counting is resumed.

An exemplary implementation of the range counter 30 will now be described in greater detail with reference to FIG. 4. The counter is comprised of 16 binary stages $Q_1$ (LSB) to $Q_{16}$ (MSB) which operate in the count down mode as a sweep range counter (PPI display mode) or as a line range counter (graphic-line mode). Associated with the stages $Q_1$ to $Q_{16}$ are 19 binary stages $Q_{21}$ to $Q_{39}$, which function as a range buffer register, and provide the function of the temporary storage register 36.

The value entered into the range counter for a graphic line from the graphic control unit is serially shifted into the buffer register stages $Q_{24}$ to $Q_{39}$ under State 1 of the counter control 31. The range value is then range scaled during State 2 of the control. Scaling is carried out as a function of display range selection and fast count detection. This scaling is normally carried out as follows: ($X$ signifies a data bit, MSB always O)

TABLE II

| Range select | $Q_{39}$ | | | | | | Scaled range value | | | | | | | | | $Q_{24}$ | Maximum count down |
|---|---|---|---|---|---|---|---|---|---|---|---|---|---|---|---|---|---|
| 512 | O | O | O | O | O | O | O | X | X | X | X | X | X | X | X | X | 511 |
| 256 | O | O | O | O | O | O | X | X | X | X | X | X | X | X | X | X | 1023 |
| 128 | O | O | O | O | O | X | X | X | X | X | X | X | X | X | X | X | 2047 |
| 64 | O | O | O | O | X | X | X | X | X | X | X | X | X | X | X | X | 4095 |
| 32 | O | O | O | X | X | X | X | X | X | X | X | X | X | X | X | X | 8191 |
| 16 | O | O | X | X | X | X | X | X | X | X | X | X | X | X | X | X | 16383 |
| 8 | O | X | X | X | X | X | X | X | X | X | X | X | X | X | X | X | 32767 |

If the offset position initially loaded into the slope counters is detected to be at a point greater than 1.5 times the selected range radius in either the $X$ or the $Y$ axis, for 32, 16 or 8 mile selections, the register is additionally range scaled as follows:

TABLE III

| Range select | Additionally scaled range value $Q_3$ ... ... ... ... ... ... ... ... ... ... ... ... ... ... $Q_2$ | | | | | | | | | | | | | | | | Temporary storage | | |
|---|---|---|---|---|---|---|---|---|---|---|---|---|---|---|---|---|---|---|---|
| | $Q_{39}$ | | | | | | | | | | | | | | | $Q_{24}$ | $Q_{23}$ | $Q_{22}$ | $Q_{21}$ |
| 32 | 0 | 0 | 0 | 0 | 0 | 0 | X | X | X | X | X | X | X | X | X | X | X | X | X |
| 16 | 0 | 0 | 0 | 0 | 0 | X | X | X | X | X | X | X | X | X | X | X | X | X | X |
| 8 | 0 | 0 | 0 | 0 | X | X | X | X | X | X | X | X | X | X | X | X | X | X | X |

A gate 41 is enabled by the State 1 signal for serially loading the range value. Gate 42 is not used during graphic-line display, and gate 43 merely ORs the output from these two load control gates. The State 2 signal then enables the shift operation to take place. A PRESET signal from the control 31 is set true after the maximum period required for shifting, i.e., after range scaling is complete. That enables the scaled data to be entered in parallel into stages $Q_1$ to $Q_{16}$ from stages $Q_{24}$ to $Q_{39}$.

If an off-screen condition has resulted in the shift of data bits into the temporary storage register positions $Q_{23}$, $Q_{22}$ and $Q_{21}$, the three least significant bits of the range value are not entered into stages $Q_1$ to $Q_3$ and the most significant bit of the range value is entered three stages down into stage $Q_{13}$. This results in counting down eight times less clock pulses than normal while the slope counters are counting up or down to within 1.5 $R$. The deflection counters are caused to count eight times the normal by gating in pulses to be counted from stage $Q_1$ to the fourth least significant bit of the slope counters during fast count down, i.e., during the presence of an OFF-SCREEN signal. This is schematically illustrated in FIG. 3 by a relay $K_1$ which is energized by the accelerated count control unit 37 to switch contacts $K_{1a}$ and $K_{1b}$ from the LSB position of the slope counter to the fourth LSB position. In practice, electronic gates would be used instead of the relay to switch the $X$ and $Y$ pulses to the fourth LSB.

Figure 5:
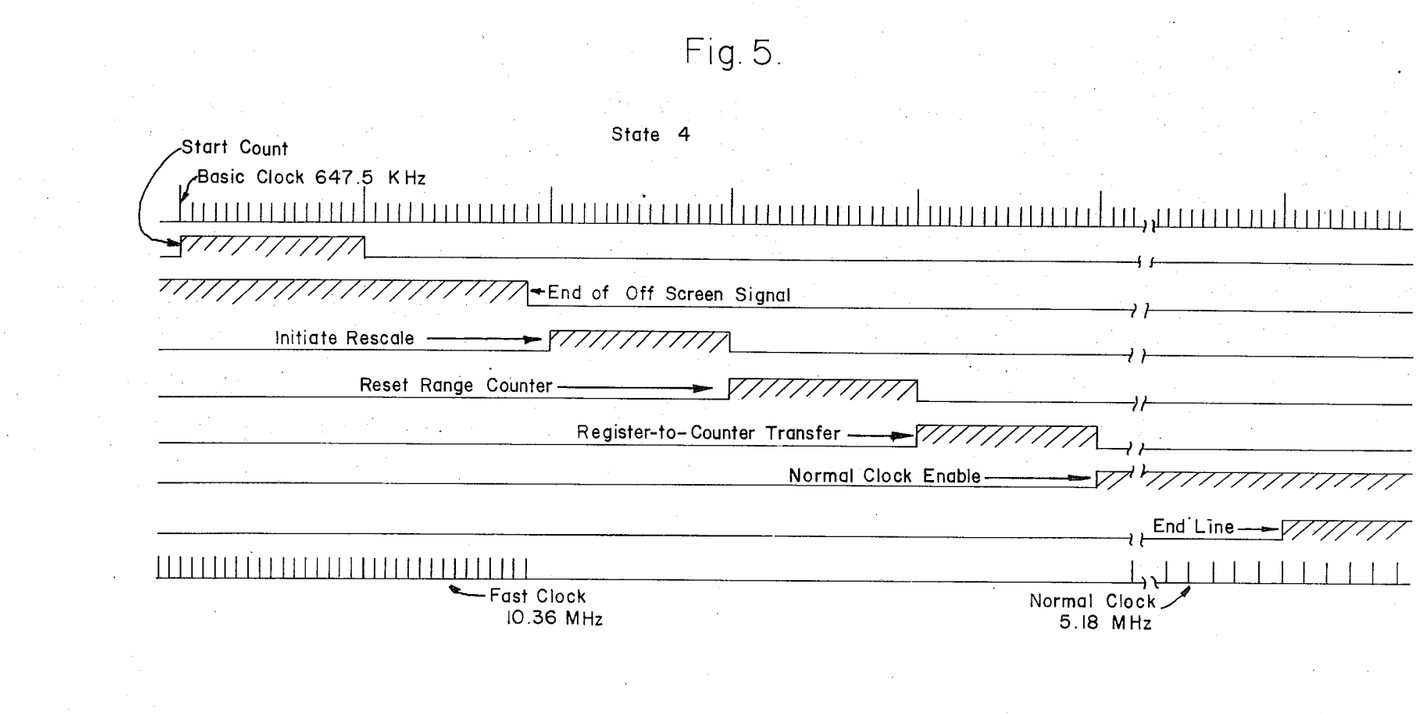
FIGS. 5 and 7 are timing diagrams useful in understanding the operation of the line generator unit of FIG. 3.

The range counter count down is enabled by the START COUNT control signal at State 4 of the counter control 31. A timing diagram for that control unit is shown in FIG. 5. The range counter counts down at the normal count rate (5.18 MHz) to zero, assuming no off-screen condition is present. At that time, an END LINE signal is sent to the graphic control unit 15 to signify that the line count for the commanded count is complete. That END LINE condition is determined by detecting a zero in all stages $Q_1$ to $Q_{16}$ of the range counter. The counter control may thus consist of simply a flip-flop set by a START COUNT signal and reset by the END LINE signal.

When a zero is detected in the counter, the control flip-flop is reset. In practice, however, the counter control may be comprised of a more complex network to accommodate more functions, including range sweep during radar live-time not involved in this invention. It may also include a logic network for controlling the scaling described with reference to FIG. 4.

If an off-screen condition is detected, the range counter receives the fast count clocks (10.18 MHz) until both $X$ and $Y$ deflection counters count to within 1.5 times the range radius area, as noted hereinbefore. For example, if the range scale selected is 8 miles, the fast count is continued until the $X$ and $Y$ slope counters are each at or within 12 miles deflection for the scale of $R=8$ miles. Stated in general terms, fast count is continued until the slope counters are within $R + \Delta R$ with reference to the CRT center, where $R$ is the display radius and $\Delta$ is equal to $2^n/X$, and where $n$ is the accelerated count multiple, such as 2, 3, 4, etc. (chosen to be 3 in this illustrative embodiment) and $X$ is the number of resolution elements per display radius. Recall that upon detecting an off-screen condition due to initial offset in the $X$ and $Y$ slope counters, the range value normally loaded into the range counter ($Q_1 - Q_{16}$) via the normal register stages ($Q_{24} - Q_{39}$) is shifted down three bit positions such that the three LSB's of the range value are shifted down into temporary storage ($Q_{21} - Q_{23}$). The result is a scaling of the range value such that, except for the three LSB's in temporary storage, the actual range value is literally being counted down at 8 times the normal rate per clock applied. In addition, the clock rate has been doubled, although that is not necessary and is incidental to the present invention, but is done when the circuits used are capable of operating at frequencies greater than the normal clock rate of 5.18 MHz. In that manner, the slope counters will receive $X$ and $Y$ pulses at rates increased by a factor of 2 due to the doubling of the clock rate. To compensate for the fact that the range value has been additionally scaled by shifting down three places, the slope counters are effectively shifted down three places by switching the $X$ and $Y$ pulse trains from the LSB's up to the 4th LSB, i.e., to stages corresponding to stage $Q_4$ of the range counter as noted hereinbefore by energizing the relay $K_1$, or the equivalent in electronic gates. This switching is done in response to the OFF SCREEN signal within axis control unit 25. In that manner, the range counter effectively counts down 16 times faster than normal, and the slope counters likewise count up, or down, 16 times faster than normal.

Once the fast count mode is initiated in response to an OFF SCREEN signal, the range counter counts down at the fast clock rate (10.18 MHz) until both $X$ and $Y$ slope counters are within 1.5 times the range radius, as noted hereinbefore. At this time the OFF SCREEN signal is low and the remaining range value is rescaled up three bit positions. At the same time, the three least significant bit positions in temporary storage are brought back into play to restore the endpoint accuracy of the original graphic line specified. Thereafter, the count down of range value continues at the normal clock rate (5.18 MHz) while the $X$ and $Y$ pulse trains are redirected to the LSB's of the slope counters by de-energizing the relay $K_1$ or the equivalent in electronic gates. Offset stored in the 3 LSB's of the $X$ and $Y$ slope counters are also maintained stored for line end point accuracy.

To accomplish this rescaling, the content of the range counter (stages $Q_1 - Q_{16}$) is transferred in parallel to corresponding stages ($Q_{27} - Q_{39}$) of the range shift register in response to a RESCALE INITIATE pulse generated by the accelerated count control unit 37, as shown by the timing diagram of FIG. 5. At the same time, the content of the temporary register ($Q_{21} - Q_{23}$) is transferred in parallel up three bit positions into stages $Q_{24} - Q_{26}$ of the input register.

Following the RESCALE INITIATE pulse, a RESET RANGE COUNTER pulse is transmitted by the accelerated count control unit to reset counter stages $Q_1 - Q_{16}$. Next in sequence, a REGISTER-TO-COUNTER pulse from that control unit transfers the content of the register ($Q_{24} - Q_{39}$) to the counter stages ($Q_1 - Q_{16}$). Once this is done, a NORMAL CLOCK ENABLE signal is initiated by the control unit to permit the normal clock (5.18 MHz) to drive the range counter until count zero is achieved to generate the END LINE signal shown in FIG. 5.

Figure 4:
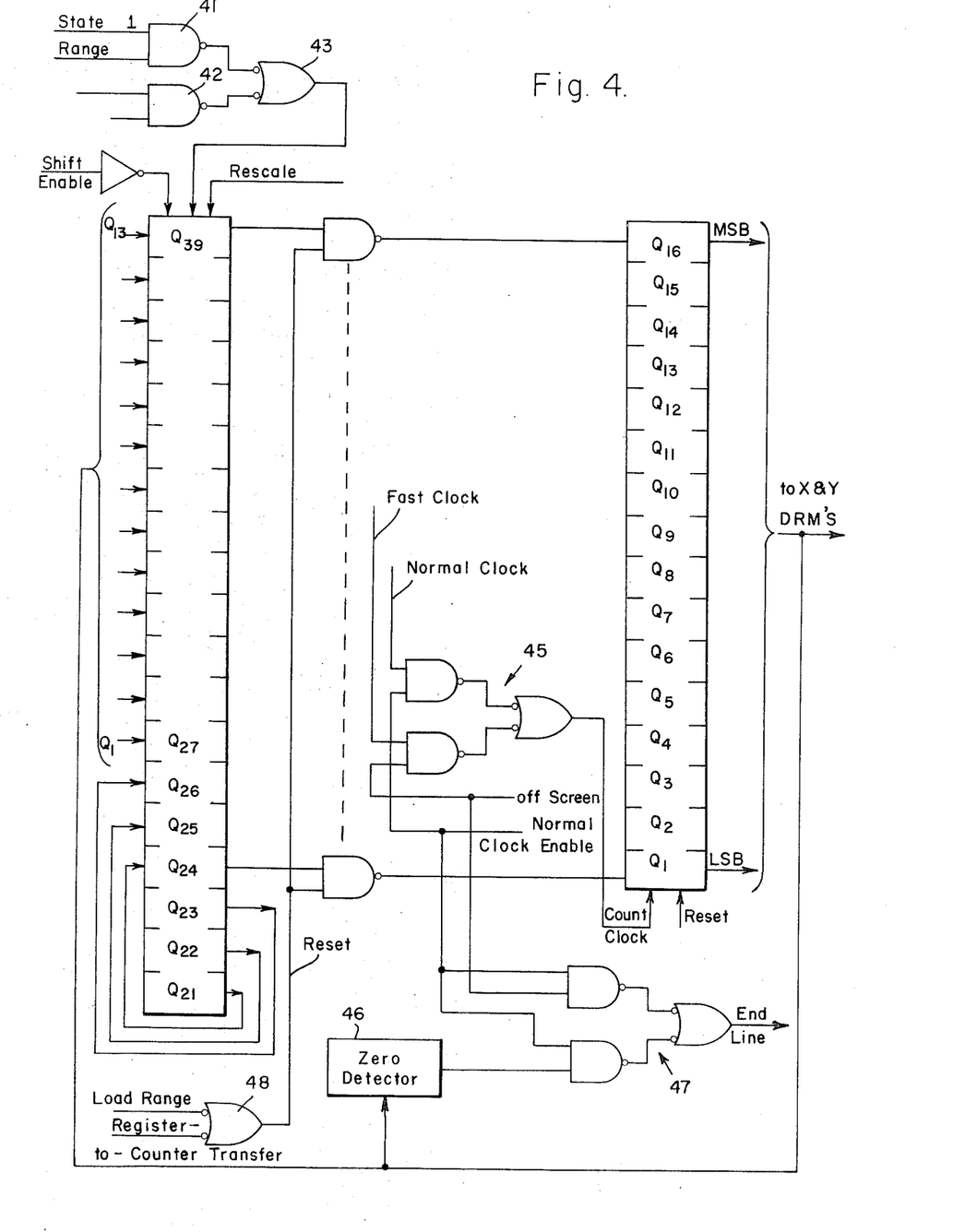
FIG. 4 illustrates an exemplary embodiment of the range counter and temporary storage register in the line generator unit of FIG. 3.

The selection of the fast clock of 10.36 MHz during the presence of an OFF SCREEN signal and the normal clock of 5.18 MHz during the presence of a NORMAL CLOCK ENABLE signal is accomplished by gating, i.e., by implementation of the logic COUNT CLOCK = (FAST CLOCK) · (OFF SCREEN) + (NORMAL CLOCK) · (NORMAL CLOCK ENABLE) as indicated by a logic network 45 in FIG. 4. The NORMAL CLOCK ENABLE is generated initially upon the START command being generated unless the OFF SCREEN signal is true at that time, in which case the "fast count" sequence ensues. In either case, once the normal count is started, the END LINE signal is generated when the range counter reaches zero or when a count from on to off-screen is subsequently detected. This may be accomplished by "anding" the NORMAL CLOCK ENABLE signal with a COUNTER ZERO signal in one gate and the NORMAL CLOCK ENABLE with the OFF SCREEN signal, and "oring" the outputs of the two gates to generate the END LINE signal. In that way a line started on the CRT screen is terminated when either the $X$ or the $Y$ slope counter reaches 1.5 $R$, such as when the line is started off center and/or when the range scale places the end point of the line off the screen. If the end point is reached before an off screen condition can occur, again due to an offset or a range scale selection, the line generating process is terminated. A decoder 46 is shown in FIG. 4 for detecting the count of zero in the range counter. A logic network 47 is connected to that detector to produce the END LINE signal as just described. It is, of course, to be understood that the video control unit 20 blanks the CRT beam whenever the beam is off the display screen in the usual manner.

The digital rate multipliers (DRM's) 32 and 33 derive their inputs from the range counter 30, just described with reference to FIG. 4, and the read-only memory in the azimuth control unit 22 (FIG. 2). The latter provides sine and cosine functions for the angle $\theta$. These functions are stored in the $X$ and $Y$ DRM's according to the following table:

TABLE IV

| QUADRANT | X DRM | Y DRM |
|---|---|---|
| I (0°–90°) | +sine$\theta$ | +cosine$\theta$ |
| II (90°–180°) | +sine$\theta$ | −cosine$\theta$ |
| III (180°–270°) | −sine$\theta$ | −cosine$\theta$ |
| IV (270°–360°) | −sine$\theta$ | +cosine$\theta$ |

The X DRM gates the range counters LSB ($Q_1$) 2nd LSB ($Q_2$), etc. sine $\theta$ value MSB, 2nd MSB, etc. (and a count clock for synchronization) such that the $X$ pulse train contains pulses at the rate $R \sin \theta$. Similarly, the cosine DRM gates the range counter LSB ($Q_1$) 2nd LSB ($Q_2$), etc. with the digital cosine $\theta$ value MSB, 2nd MSB, etc (and a count clock for synchronization such that the $Y$ pulse train contains pulses at the rate $R \cos \theta$) The signs of the sine and cosine function control the up (for positive) and down (for negative) count operation of the $X$ and $Y$ slope counters.

Figure 6:
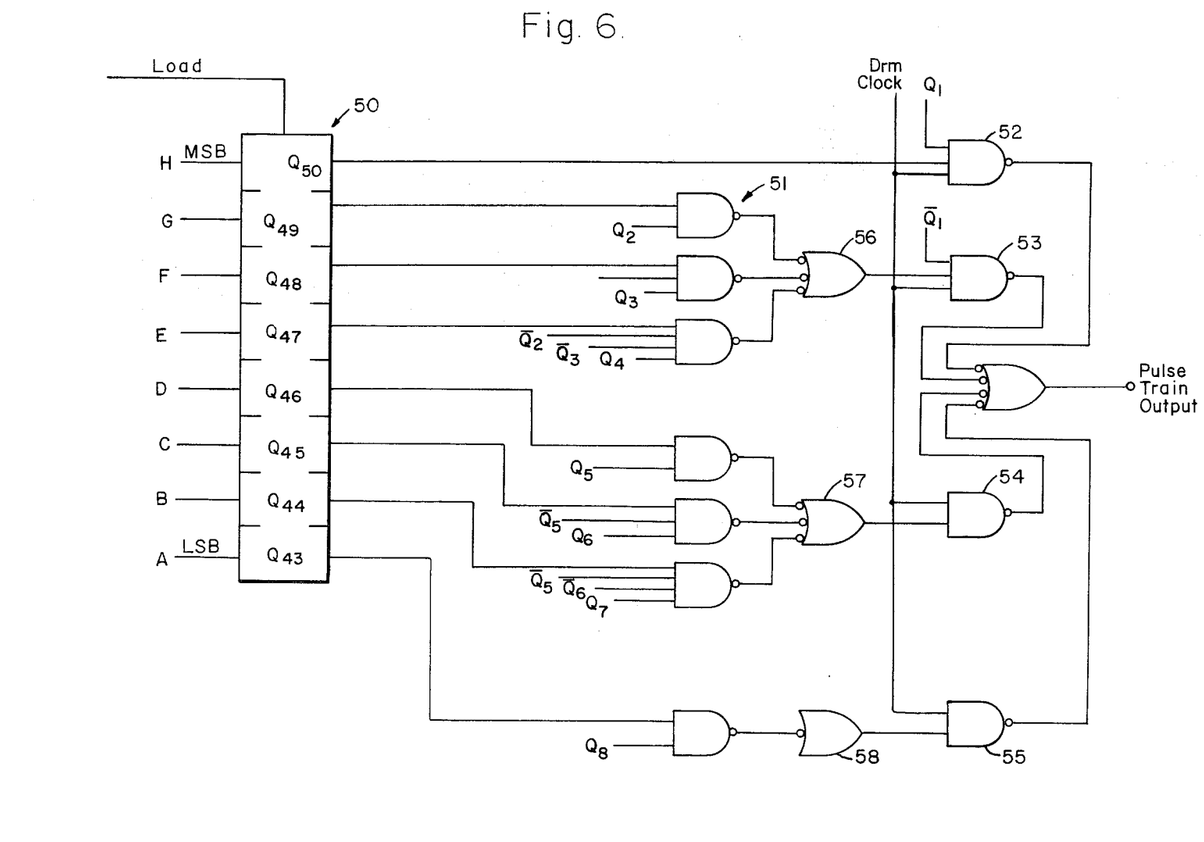
FIG. 6 is a logic diagram of an exemplary digital rate multiplier for the line generator unit of FIG. 3.

Various techniques are known for implementating these DRM's but a preferred implementation is shown in FIG. 6. The 8-bit sine, or cosine value, is stored in a register 50 in response to a LOAD pulse produced by the azimuth control unit 22 (FIG. 2). The binary digits A through H (LSB through MSB) are stored in the respective 8 stages $Q_{43}$ to $Q_{50}$. A bank of NAND gates 51 enable NAND gates 52 to 55 through NAND gates 56 to 57 to transmit DRM CLOCKS as the range counter toggles. In that manner the DRM "ands" the range counter LSB's with the sine, or cosine, digits and the BASIC CLOCK such that the PULSE TRAIN at the output enables the slope counter to which connected to count at the rate $R \sin \theta$ or $R \cos \theta$. The MSB output $Q_{50}$ of the register 50 enables 50 percent of the BASIC CLOCKS for outputs when true (equals to 1). The next MSB output $Q_{49}$ enables 25 percent, and so forth, each lower MSB enabling half that of the last in the sequence, to the LSB output $Q_{43}$ which enables 0.390625 percent of the total BASIC CLOCKS for outputs. The error at 45°, 135°, 225°, and 315° is calculated to be only 0.316° for the eight-bit DRM. At the cardinal (axis cross-over) points, less than 100 percent of the BASIC CLOCKS are transmitted, resulting in a very small range error, but no azimuth error since the DRM output for the complementary output is zero.

It has been assumed that the graphic control unit 15 (FIG. 1) provides the timing for the control of graphic line display in this exemplary embodiment. However, in practice other functions are to be performed by the display system which are not here involved. Accordingly, in any given radar display system embodying the invention, a separate and more complex timing control would be provided by a separate unit. In each case, the timing would be within a predetermined time frame which includes the control signals that have been referred to hereinbefore.

Figure 7:
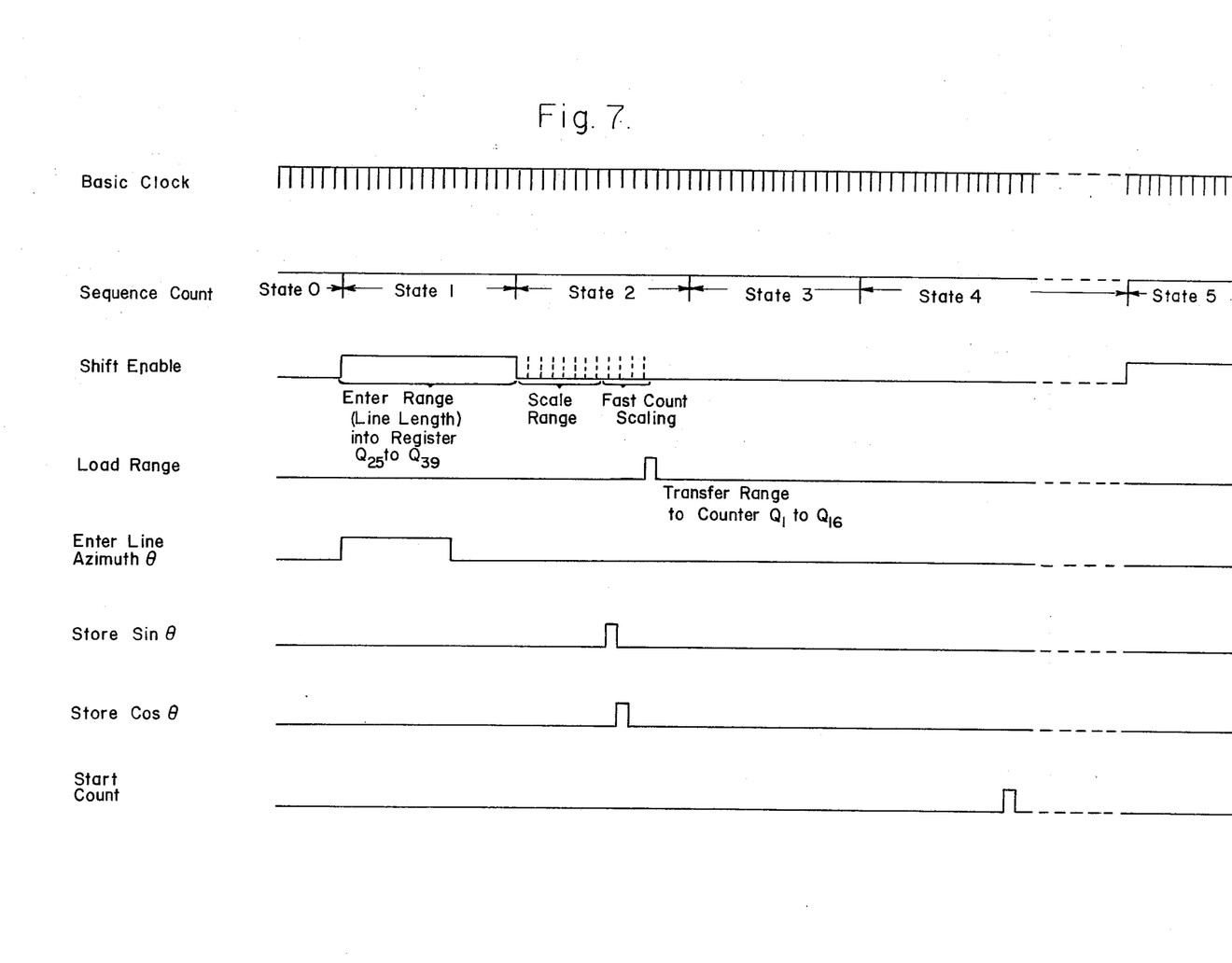

A typical time frame employs a 3-stage binary counter which cycles through eight distinct states 0, 1, 2, . . . 7. The different states are decoded to time the different events. FIG. 7 shows such a typical time frame from the end of a state 0 used for radar sweep through states 1, 2, 3 and 4. The first three states 1, 2 and 3 are used to prepare the system for graphic display.

Each of the states 1, 2 and 3 is timed in sequence by a 4-bit binary counter which counts 16 basic clock pulses for each of those states. State 4 then runs an indefinite period as required for the graphic line to be displayed, i.e., until an END LINE signal is generated to advance the sequence counter to state 5.

The remaining states 5, 6 and 7 are used in a manner similar to states 1, 2 and 3, but to prepare the system for radar sweep display. Then the radar sweep period 0 is initiated. Since those states (5 through 7 and 0) are not involved in this invention, only the timing sequence for states 1 through 4 are discused with reference to FIG. 7.

During state 1, which gates data through NAND gate 41 (FIG. 4), the SHIFT ENABLE signal is true. This allows a range count to be shifted into register stages $Q_{24}$ through $Q_{39}$. At the same time, the slope counters 38 and 39 are enabled to store $X$ and $Y$ offset values. Following that, during state 2, the range count is scaled, and in the event of an off-screen condition, the range count is further scaled to shift the three least significant digits into temporary storage register as described with reference to FIG. 4. A LOAD RANGE signal is then transmitted through NAND gate 48 to transfer the contents of stages $Q_{24}$ through $Q_{39}$ in the register to stages $Q_1$ through $Q_{16}$ in the counter. The OFF SCREEN signal, which requires the further scaling of range count prior to loading it into the counter, is not a timing signal and is therefore not shown in FIG. 7. Its role in initiating an end-of-line sequence is more clearly shown in FIG. 5 which shows the pertinent portion of state 4 in larger scale.

During the first part of state 1, an ENTER LINE AZIMUTH signal is generated to enable the azimuth control unit to store the azimuth of the graphic line to be displayed. Then during clocks 8 and 9 of state 2, the sine and cosine values of the line azimuth are stored in the $X$ and $Y$ DRM register. The graphic display system is then ready to start, and a START COUNT signal is generated during clock 4 of state 4.

The scale selection is made by the operator at the control panel 16, and through the timing control unit 15 provides the SHIFT ENABLE signal for the 16 clock periods during state 1 plus one additional clock period during state 2 for each range increment from 8 to 16 miles, from 16 to 32 and so forth. For example, if a range of 128 miles is selected, the SHIFT ENABLE signal is extended for four more clock periods. The SHIFT ENABLE signal is then turned off and after the seventh clock period, i.e., after maximum range scaling has been permitted, it is turned on again for three additional lock periods if an off-screen condition is present to provide additional scaling as described hereinbefore with reference to Table III. In that manner the SHIFT ENABLE is used to provide scaling of range and to provide additional scaling for the fast count mode. Once the START COUNT signal occurs, the OFF SCREEN signal will select the fast clock. If such a fast clock were not provided, the normal clock would be used, and fast count still provided by this additional scaling, as noted hereinbefore.

If the off-screen condition is still present when the range counter has counted down to zero during a fast count, the sequence of displaying the graphic line is terminated. Otherwise, the sequence of FIG. 5 is followed to rescale the range count for normal operation. Once counting has started at the normal rate, for on-screen display of a line, the counting will continue at the normal rate until the end of the line is reached, even if the end is off the screen. This is because for a PPI display it is normally not expected that a line will go from on-screen to off-screen. In other applications, such as for mapping, that may occur frequently, and if so, it would be an obvious expedient to use the present invention by interrupting the count and reiterating the sequencing cycle from state 2 clock 7, through state 4. The current state of the range counter would simply by regarded as the range scaled input of the line length and additionally scaled for a fast count until the end of the line is reached.

Although particular embodiments of the invention have been described and illustrated herein, it is recognized that modifications and variations may readily occur to those skilled in the art. It is therefor intended that the claims be interpreted to cover such modifications and variations.

What is claimed is:

1. In a cathode-ray tube display system having digital means for deflection of an electron beam in said tube, said digital deflection means including means for storing a number proportional to the length of a graphic line to be displayed and means for counting a number of fixed-frequency clock pulses equal to said stored number to control said deflection means in displaying a graphic line, an improvement comprised of means for scaling said stored number for a desired graphic display scale by shifting said stored number in said storage means, thereby altering the number of clock pulses counted for the graphic line displayed to alter the scale thereof while maintaining the deflection rate of said beam constant for all range scales, thereby maintaining uniform brightness in the display of graphic lines of all lengths at all scales.

2. In a cathode-ray tube display system for displaying graphic lines, said system having digital means for deflection of an electron beam in said tube in an X axis direction and digital means for simultaneous deflection of said electron beam in a Y axis direction while displaying a graphic line of a specified length at a specified angle with respect to one of said axes, said x- and y-axis deflection means including a source of clock pulses occurring at a fixed rate and means for counting a number of said clock pulses proportional to the specified length of a graphic line to be displayed in order to produce a running line length count for the graphic line specified, an improvement comprised of means for storing said length of a line to be displayed in binary digital form, and means for scaling said length for a desired graphic display scale before counting clock pulses by shifting said length in said storing means, thus altering the number of clock pulses counted to alter the scaled length of the graphic line displayed while maintaining the deflection rate of said beam constant for uniform brightness.

3. Apparatus as defined in claim 2 wherein said scaling means is comprised of a shift register and said scaling means is comprised of means for applying shift pulses to said shift register, one shift pulse for each binary order of difference in the desired scale over a range scale which requires the maximum number of clock pulses to be counted for a line of maximum length.

4. Apparatus as defined in claim 3 wherein said counting means is a count-down binary counter connected to receive a scaled length and to receive said clock pulses for counting down said scaled length to zero, thereby counting a number of said clock pulses proportional to the specified length of a graphic line to be displayed.

5. Apparatus as defined in claim 4 wherein said digital means for deflection of said electron beam of said tube in said $X$ and $Y$ axes is comprised of separate $X$ and $Y$ binary counters and means for producing $X$ and $Y$ trains of pulses effectively at the respective rates $R \sin \theta$ and $R \cos \theta$, where $R$ is the scaled length of the line specified and $\theta$ is said specified angle of said line, and wherein said $X$ and $Y$ pulse trains are applied to the least significant binary stages of said $X$ and $Y$ counters respectively, whereby upon accummulating said trains of pulses in said $X$ and $Y$ counters until said counting means counts down to zero in response to clock pulses, at a fixed frequency, the electron beam is deflected said distance $R$ at said angle $\theta$ without changing the connections of the pulse trains to the least significant binary stages of said $X$ and $Y$ counters for scaling, thereby maintaining a substantially constant beam deflection rate for lines displayed at any selected scale.

* * * * *